United States Patent
Kurtz

(10) Patent No.: US 9,003,776 B2
(45) Date of Patent: Apr. 14, 2015

(54) METHOD FOR REGENERATING AN EXHAUST AFTER TREATMENT DEVICE

(75) Inventor: Eric Kurtz, Dearborn, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 148 days.

(21) Appl. No.: 13/561,858

(22) Filed: Jul. 30, 2012

(65) Prior Publication Data

US 2014/0026539 A1    Jan. 30, 2014

(51) Int. Cl.
| | |
|---|---|
| *F01N 3/00* | (2006.01) |
| *F02D 41/40* | (2006.01) |
| *F02D 41/02* | (2006.01) |
| *F02D 35/02* | (2006.01) |
| *F01N 3/08* | (2006.01) |
| *F01N 9/00* | (2006.01) |

(52) U.S. Cl.
CPC ............ *F02D 41/405* (2013.01); *F02D 41/024* (2013.01); *F02D 35/026* (2013.01); *F02D 2250/11* (2013.01); *Y02T 10/44* (2013.01); *Y02T 10/26* (2013.01); *F01N 3/0871* (2013.01); *F01N 9/002* (2013.01); *F01N 2430/085* (2013.01)

(58) Field of Classification Search
USPC ............................ 60/274, 286, 295, 297, 311
See application file for complete search history.

(56) References Cited

U.S. PATENT DOCUMENTS

| | | | |
|---|---|---|---|
| 6,293,095 B1 * | 9/2001 | Yamamoto et al. ............. | 60/286 |
| 6,434,929 B1 * | 8/2002 | Nishimura et al. ............. | 60/278 |
| 6,666,019 B2 * | 12/2003 | Kawatani et al. ............... | 60/286 |
| 6,684,630 B2 * | 2/2004 | Uchida et al. ................... | 60/284 |
| 7,779,622 B2 * | 8/2010 | Kondou et al. ................. | 60/286 |
| 8,046,153 B2 | 10/2011 | Kurtz et al. | |
| 8,201,396 B2 * | 6/2012 | Kawamura et al. ............. | 60/295 |
| 8,489,308 B2 * | 7/2013 | Zanetti et al. ................. | 701/103 |
| 2008/0196392 A1 | 8/2008 | Stroia et al. | |
| 2009/0090099 A1 | 4/2009 | Wu et al. | |
| 2011/0066354 A1 | 3/2011 | Cassani et al. | |
| 2011/0162628 A1 | 7/2011 | Kurtz et al. | |

FOREIGN PATENT DOCUMENTS

| | | |
|---|---|---|
| EP | 1798404 A1 | 12/2006 |
| EP | 2048333 B1 | 7/2007 |

OTHER PUBLICATIONS

Siebers, Dennis L., "Scaling Liquid-Phase Fuel Penetration in Diesel Sprays Based on Mixing-Limited Vaporization," SAE Technical Paper Series 1999-01-0528, International Congress and Exposition, Detroit, Michigan, Mar. 1-4, 1999, 28 pages.

* cited by examiner

*Primary Examiner* — Binh Q Tran
(74) *Attorney, Agent, or Firm* — Julia Voutyras; Alleman Hall McCoy Russell & Tuttle LLP

(57) ABSTRACT

Methods and systems for regenerating an after treatment device are disclosed. In one example, the possibility of introducing fuel to oil during after treatment device regeneration is reduced. The methods and systems may reduce engine degradation and improve engine emissions.

20 Claims, 4 Drawing Sheets

METHOD FOR REGENERATING AN EXHAUST AFTER TREATMENT DEVICE

BACKGROUND/SUMMARY

Diesel engines have relatively high efficiency as compared to other internal combustion engines. With the higher engine efficiency comes lower engine exhaust temperatures. Lower exhaust temperatures can make regeneration of after treatment devices more difficult because after treatment devices often begin to regenerate at higher temperatures. One way to produce higher temperatures in an exhaust system is to inject fuel late in a cylinder cycle (e.g., during an exhaust stroke) so that the fuel can oxidize in the exhaust system, thereby increasing the exhaust system temperature. However, when liquid fuel is injected in an exhaust stroke, some portion of the injected fuel can impinge on cylinder walls in liquid form. Fuel that encounters cylinder walls in liquid form may degrade the oil film on the cylinder wall and increase cylinder wall wear. Further, liquid fuel may enter the engine crankcase and dilute engine oil. Consequently, it may be desirable to reduce the amount of injected liquid fuel that reaches cylinder walls during injection.

In European patent application EP 1,798,404 A1, a method for regenerating an after treatment device via post injection control is described. The method estimates a fuel spray brakeup length based on a differential pressure between an interior and exterior of an injector hole. The method adjusts fuel injection time so that the fuel spray brakeup length is less than a distance S to a cylinder wall. However, the fuel spray brakeup length as determined via a delta pressure may not be as accurate as is desired. Consequently, fuel spray may still impinge on cylinder walls during some conditions.

The inventor herein has recognized the above-mentioned disadvantages and have developed a method for regenerating an exhaust after treatment device, comprising: performing combustion in a cylinder of an engine during a cylinder cycle; injecting an amount of fuel in a fuel injection pulse after a combustion event in the cylinder and before exhaust valve closing during the cylinder cycle, the amount of fuel in the fuel injection pulse adjusted for a density of a gas mixture in the cylinder; and regenerating an after treatment device via the amount of fuel.

By adjusting a post injection fuel quantity in response to cylinder mixture density, it may be possible to better estimate an amount of fuel injected that impinges on a cylinder wall in liquid form so that fuel injected for after treatment device regeneration is less than the amount that impinges on the cylinder wall in liquid form when injected. In particular, an estimate of fuel spray penetration may be improved by accounting for cylinder density and temperature. Cylinder mixture density and temperature provide a more accurate estimate of fuel spray penetration than cylinder pressure or injector delta pressure since cylinder mixture density and temperature account for both fuel evaporation and momentum transfer.

Additionally, the inventor has also determined that cylinder volumetric efficiency is another parameter that may be accounted for to improve fuel spray penetration estimates. Cylinder volumetric efficiency can affect temperature of gases in a cylinder as well as fractions of air and residual exhaust gas that make up a cylinder mixture. In this way, cylinder volumetric efficiency can affect density and temperature within the cylinder at the time of injection. Consequently, by considering cylinder mixture density, cylinder volumetric efficiency, and temperature, timing of a post injection fuel amount may be improved so that fuel spray more closely approaches a cylinder wall, yet does not impinge on the cylinder wall in liquid form. As a result, larger amounts of fuel may be injected into a cylinder without causing fuel to impinge on cylinder walls in liquid form.

The present description may provide several advantages. In particular, the approach may reduce engine degradation. Further, the present approach may reduce engine emissions by reducing engine oil dilution. Further still, the approach may be applied without costly in-cylinder sensors. Additionally, the approach may increase an engine oil change interval and/or allow for a smaller oil sump containing less oil.

The above advantages and other advantages, and features of the present description will be readily apparent from the following Detailed Description when taken alone or in connection with the accompanying drawings.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

DETAILED DESCRIPTION

Figure 1:
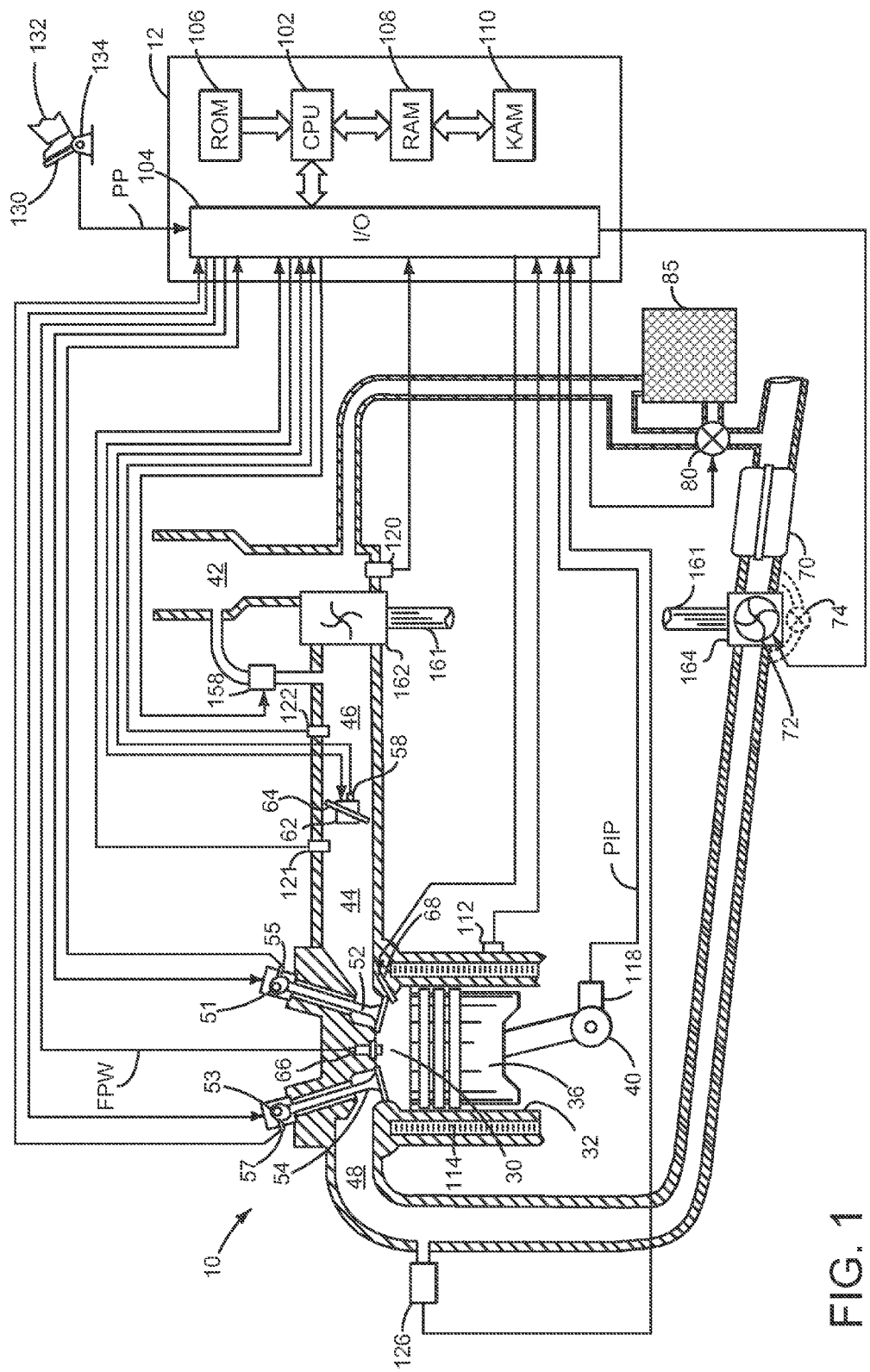
FIG. 1 shows a schematic depiction of an engine.
Figure 2:
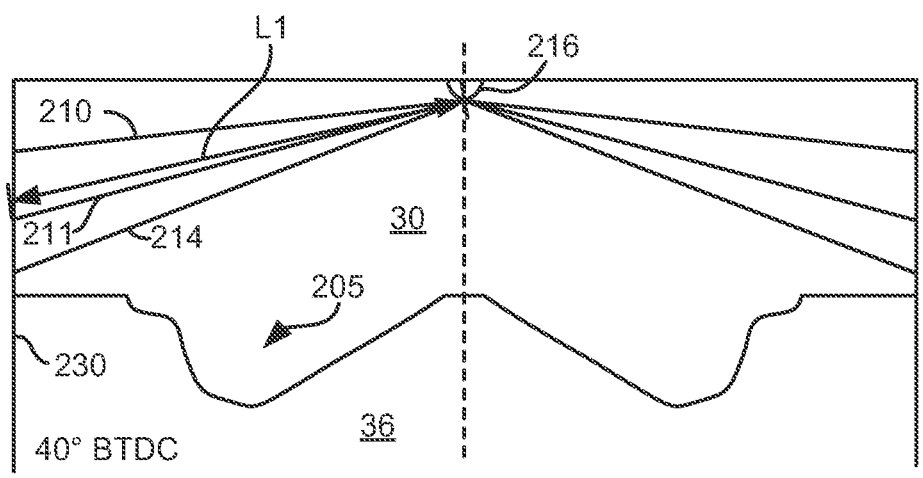
FIG. 2 shows an example fuel spray penetration length.
Figure 3A:
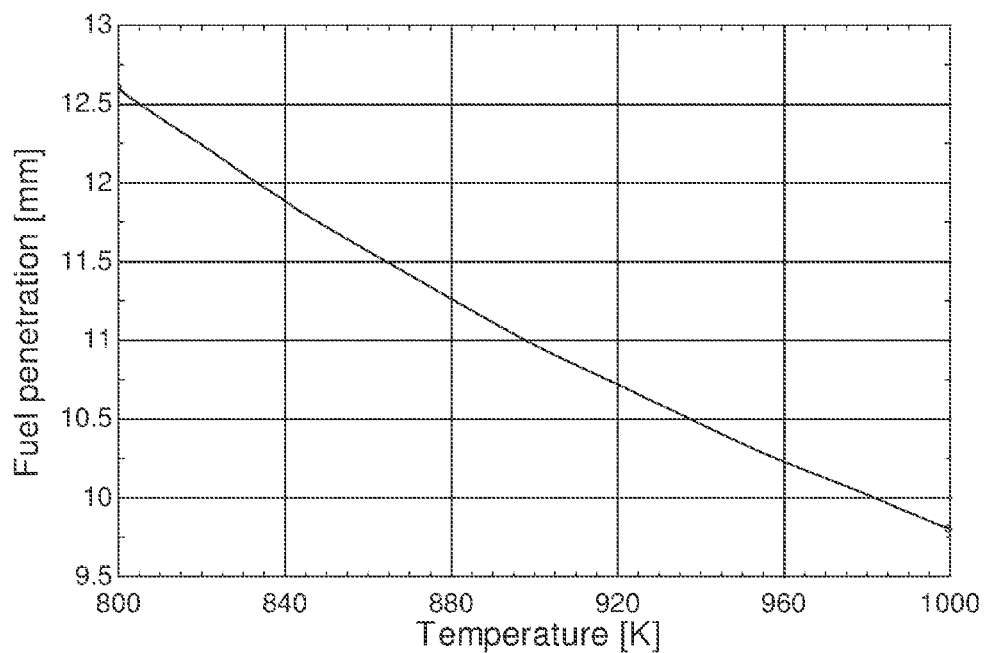
FIGS. 3A-3B show example plots of how cylinder mixture density and temperature can affect fuel spray penetration length.
Figure 3B:
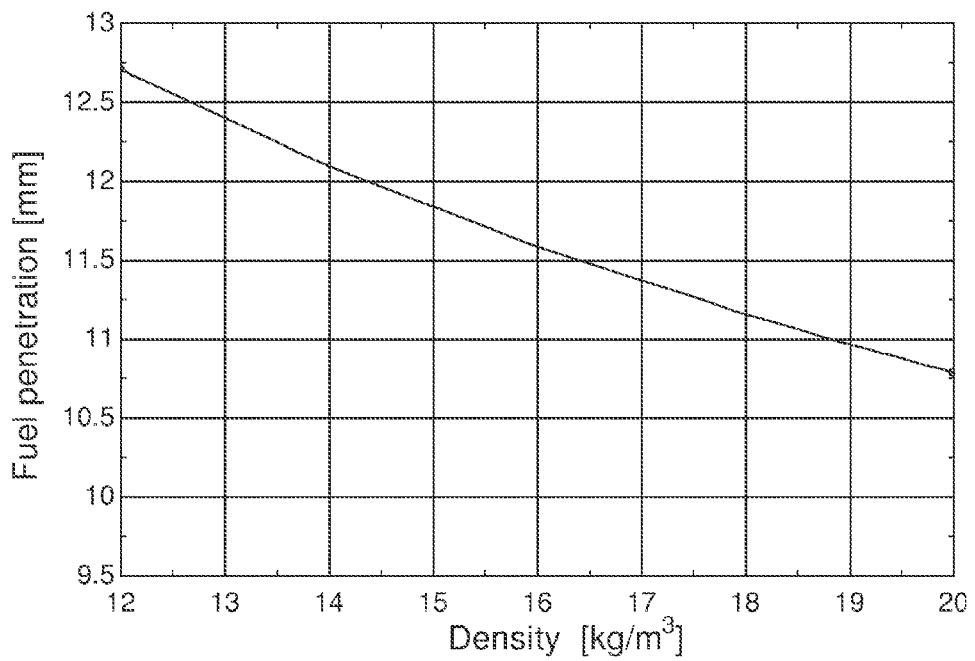
Figure 4:
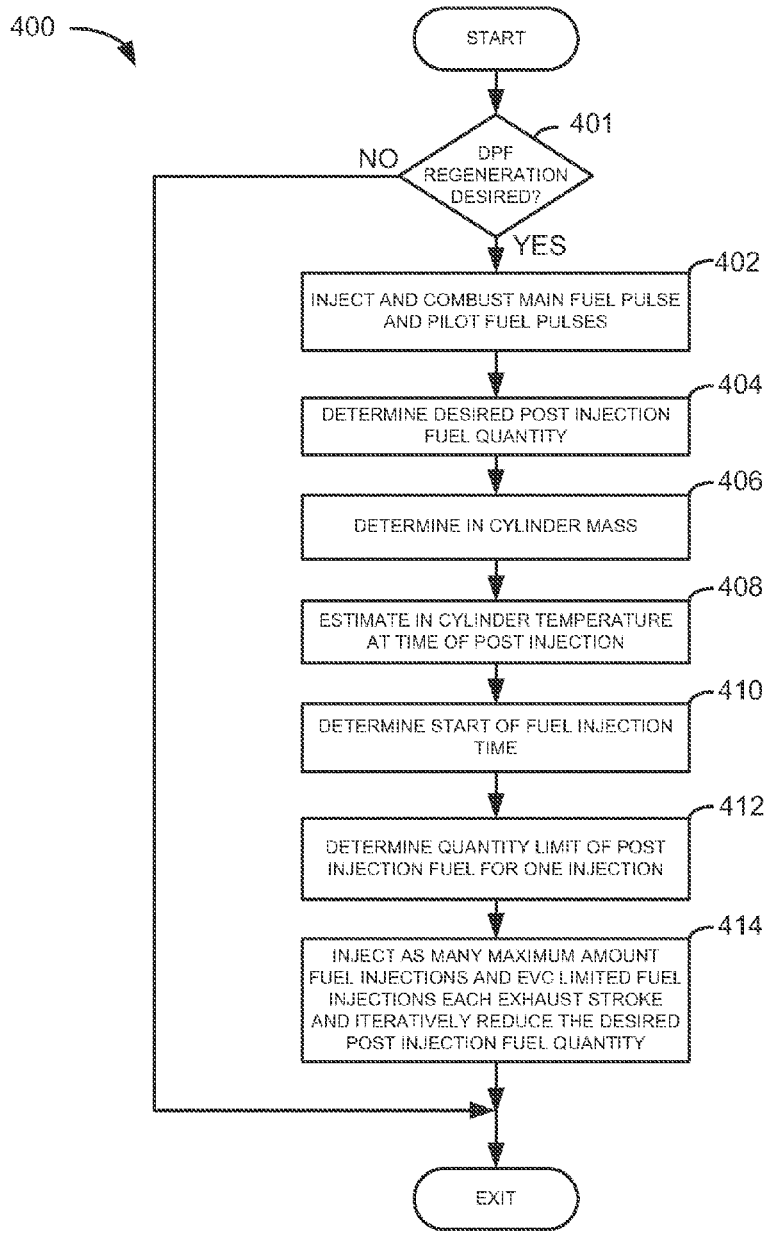
FIG. 4 shows an example method for regenerating an after treatment device.

The present description is related to regenerating an exhaust after treatment device. FIG. 1 shows one example of a boosted diesel engine where the method of FIG. 4 initiates after treatment device regeneration via controlling post combustion fuel injection. FIG. 2 shows an example fuel spray penetration length which provides a basis for an amount of fuel that may be injected to initiate after treatment device regeneration. FIGS. 3A-3B illustrate how cylinder mixture density and pressure influence fuel spray penetration. Finally, FIG. 4 is an example method for regenerating a particulate filter.

Referring to FIG. 1, internal combustion engine 10, comprising a plurality of cylinders, one cylinder of which is shown in FIG. 1, is controlled by electronic engine controller 12. Engine 10 includes combustion chamber 30 and cylinder walls 32 with piston 36 positioned therein and connected to crankshaft 40. Combustion chamber 30 is shown communicating with intake manifold 44 and exhaust manifold 48 via respective intake valve 52 and exhaust valve 54. Each intake and exhaust valve may be operated by an intake cam 51 and an exhaust cam 53. The position of intake cam 51 may be determined by intake cam sensor 55. The position of exhaust cam 53 may be determined by exhaust cam sensor 57.

Fuel injector 66 is shown positioned to inject fuel directly into combustion chamber 30, which is known to those skilled in the art as direct injection. Fuel injector 66 delivers fuel in proportion to the pulse width of signal from controller 12. Fuel is delivered to fuel injector 66 by a fuel system (not shown) including a fuel tank, fuel pump, fuel rail (not shown). Fuel pressure delivered by the fuel system may be adjusted by varying a position valve regulating flow to a fuel pump (not shown). In addition, a metering valve may be located in or near the fuel rail for closed loop fuel control. A pump metering valve may also regulate fuel flow to the fuel pump, thereby reducing fuel pumped to a high pressure fuel pump.

Intake manifold 44 is shown communicating with optional electronic throttle 62 which adjusts a position of throttle plate 64 to control air flow from intake boost chamber 46. Compressor 162 draws air from air intake 42 to supply boost chamber 46. Exhaust gases spin turbine 164 which is coupled to compressor 162 via shaft 161. In some examples, a charge air cooler may be provided. Compressor speed may be adjusted via adjusting a position of variable vane control 72 or compressor bypass valve 158. In alternative examples, a waste gate 74 may replace or be used in addition to variable vane control 72. Variable vane control 72 adjusts a position of variable geometry turbine vanes. Exhaust gases can pass through turbine 164 supplying little energy to rotate turbine 164 when vanes are in an open position. Exhaust gases can pass through turbine 164 and impart increased force on turbine 164 when vanes are in a closed position. Alternatively, wastegate 74 allows exhaust gases to flow around turbine 164 so as to reduce the amount of energy supplied to the turbine. Compressor bypass valve 158 allows compressed air at the outlet of compressor 162 to be returned to the input of compressor 162. In this way, the efficiency of compressor 162 may be reduced so as to affect the flow of compressor 162 and reduce intake manifold pressure.

Combustion is initiated in combustion chamber 30 when fuel ignites without an externally provided spark as piston 36 approaches top-dead-center compression stroke. In some examples, a universal Exhaust Gas Oxygen (UEGO) sensor 126 may be coupled to exhaust manifold 48 upstream of emissions device 70. In other examples, the UEGO sensor may be located downstream of one or more exhaust after treatment devices. Further, in some examples, the UEGO sensor may be replaced by a NOx sensor that has both NOx and oxygen sensing elements.

At lower engine temperatures glow plug 68 may convert electrical energy into thermal energy so as to raise a temperature in combustion chamber 30. By raising temperature of combustion chamber 30, it may be easier to ignite a cylinder air-fuel mixture via compression.

Emissions device 70 can include a particulate filter and catalyst bricks, in one example. In another example, multiple emission control devices, each with multiple bricks, can be used. Emissions device 70 can include an oxidation catalyst in one example. In other examples, the emissions device may include a lean NOx trap or a selective catalyst reduction (SCR), and/or a diesel particulate filter (DPF).

Exhaust gas recirculation (EGR) may be provided to the engine via EGR valve 80. EGR valve 80 is a three-way valve that closes or allows exhaust gas to flow from downstream of emissions device 70 to a location in the engine air intake system upstream of compressor 162. In alternative examples, EGR may flow from upstream of turbine 164 to intake manifold 44. EGR may bypass EGR cooler 85, or alternatively, EGR may be cooled via passing through EGR cooler 85. In other, examples high pressure and low pressure EGR system may be provided.

Controller 12 is shown in FIG. 1 as a conventional microcomputer including: microprocessor unit 102, input/output ports 104, read-only memory 106, random access memory 108, keep alive memory 110, and a conventional data bus. Controller 12 is shown receiving various signals from sensors coupled to engine 10, in addition to those signals previously discussed, including: engine coolant temperature (ECT) from temperature sensor 112 coupled to cooling sleeve 114; a position sensor 134 coupled to an accelerator pedal 130 for sensing accelerator position adjusted by foot 132; a measurement of engine manifold pressure (MAP) from pressure sensor 121 coupled to intake manifold 44; boost pressure from pressure sensor 122 exhaust gas oxygen concentration from oxygen sensor 126; an engine position sensor from a Hall effect sensor 118 sensing crankshaft 40 position; a measurement of air mass entering the engine from sensor 120 (e.g., a hot wire air flow meter); and a measurement of throttle position from sensor 58. Barometric pressure and exhaust pressure may also be sensed (sensor not shown) or inferred for processing by controller 12. In a preferred aspect of the present description, engine position sensor 118 produces a predetermined number of equally spaced pulses every revolution of the crankshaft from which engine speed (RPM) can be determined.

During operation, each cylinder within engine 10 typically undergoes a four stroke cycle: the cycle includes the intake stroke, compression stroke, expansion stroke, and exhaust stroke. During the intake stroke, generally, the exhaust valve 54 closes and intake valve 52 opens. Air is introduced into combustion chamber 30 via intake manifold 44, and piston 36 moves to the bottom of the cylinder so as to increase the volume within combustion chamber 30. The position at which piston 36 is near the bottom of the cylinder and at the end of its stroke (e.g. when combustion chamber 30 is at its largest volume) is typically referred to by those of skill in the art as bottom dead center (BDC). During the compression stroke, intake valve 52 and exhaust valve 54 are closed. Piston 36 moves toward the cylinder head so as to compress the air within combustion chamber 30. The point at which piston 36 is at the end of its stroke and closest to the cylinder head (e.g. when combustion chamber 30 is at its smallest volume) is typically referred to by those of skill in the art as top dead center (TDC). In a process hereinafter referred to as injection, fuel is introduced into the combustion chamber. In some examples, fuel may be injected to a cylinder a plurality of times during a single cylinder cycle. In a process hereinafter referred to as ignition, the injected fuel is ignited by compression ignition resulting in combustion. During the expansion stroke, the expanding gases push piston 36 back to BDC. Crankshaft 40 converts piston movement into a rotational torque of the rotary shaft. Finally, during the exhaust stroke, the exhaust valve 54 opens to release the combusted air-fuel mixture to exhaust manifold 48 and the piston returns to TDC. Note that the above is described merely as an example, and that intake and exhaust valve opening and/or closing timings may vary, such as to provide positive or negative valve overlap, late intake valve closing, or various other examples. Further, in some examples a two-stroke cycle may be used rather than a four-stroke cycle.

Thus, the system of FIG. 1 provides for an engine including a cylinder and an exhaust system; an after treatment device in an exhaust system; a fuel injector supplying fuel to the cylinder; and a controller including instructions stored in non-transitory memory to regenerate an after treatment device, the controller including additional instructions to adjust an amount of fuel supplied to the cylinder via the fuel injector in response to cylinder volumetric efficiency and a temperature of gas in the cylinder after a combustion event in the cylinder during a present cycle of the cylinder, the amount of fuel injected after the combustion event and before an exhaust valve closing of the cylinder during a cycle of the cylinder.

The system of FIG. 1 includes where the amount of fuel injected is less than an amount of injected fuel that leads to liquid fuel impingement on cylinder wall. The engine system further comprises additional controller instructions for providing a plurality of fuel injections after the combustion event and before the exhaust valve closing. The engine system further comprises additional controller instructions to inject fuel to a second cylinder after a combustion event in the second cylinder during a present cylinder cycle of the second cylinder and in response to volumetric efficiency of the second cylinder. The engine system further comprises evenly distributing a remainder of a post injection fuel quantity for a cylinder cycle between a maximum number of fuel injections that occur after combustion in the cylinder and before exhaust valve closing in the cylinder.

Referring now to FIG. 2, an example fuel spray penetration length is shown. Fuel injector nozzle 216 provides fuel to combustion chamber 30 in the form of a spray that has an upper spray cone boundary 210, spray cone centerline 211, and a lower spray cone boundary 214. The distance between nozzle 216 and the cylinder wall 230 via the spray cone centerline 211 is indicated by L1. Distance L1 is the distance of greatest fuel spray penetration into the cylinder. Thus, distance L1 is a distance that determines how far fuel spray penetration is allowed to go before fuel impinges on the cylinder wall. Consequently, fuel penetration length is adjusted to a distance less than L1 via controlling the fuel injector on time.

Referring now to FIG. 3A, it shows a plot of a relationship between fuel liquid penetration and cylinder temperature for a constant density injection environment. The X axis represents cylinder mixture temperature and the Y axis represents fuel liquid penetration length or distance. It can be observed that fuel liquid penetration decreases with increasing injection environment temperature (e.g., increasing cylinder temperature).

FIG. 3B shows a plot of fuel spray liquid penetration versus fuel density at a constant temperature. The X axis represents cylinder mixture density and the Y axis represents fuel spray liquid penetration. The plot shows that fuel spray liquid penetration increases with decreasing cylinder density. Therefore, if the cylinder mixture density is at a higher level, the fuel spray liquid cannot penetrate into the cylinder as far as when cylinder density is lower, during constant temperature conditions. Consequently, the fuel injector on time may be increased at higher cylinder densities so that more fuel may be injected without encountering the cylinder walls. Thus, FIGS. 3A-3B show that cylinder mixture density and temperature are useful for determining fuel spray penetration distance.

Referring now to FIG. 4, it shows an example method for regenerating an after treatment device while reducing the possibility of fuel in oil. The method of FIG. 4 is described in terms of a single cylinder, but it may be applied to all engine cylinders. The method of FIG. 4 may be stored as executable instructions in non-transitory memory of controller 12 shown in FIG. 1. Further, the method of FIG. 4 may provide the operating sequence shown in FIG. 3.

At 401, method 400 judges whether or not after treatment device regeneration is desired. In one example, the after treatment device is a diesel particulate filter (DPF). In another example, the after treatment device is a LNT. In the example where the after treatment device is a DPF, method 400 may judge that DPF regeneration is desired when a pressure drop across the DPF is greater than a threshold value. If method 400 judges that it is desirable to regenerate the DPF, the answer is yes and method 400 proceeds to 402. Otherwise, the answer is no and method 400 proceeds to exit.

At 402, method 400 injects and combusts a main fuel injection pulse. The main fuel injection pulse may be injected to the cylinder during a compression stroke of the cylinder, or during both the compression and expansion strokes. Further, in some examples pilot injections precede the main injection. The main injection may take place during the compression stroke, the expansion stroke, or during both the compression and expansion strokes. Further still, in some examples, one or more injections that participate in combustion in the cylinder during a cylinder cycle may be injected after the main fuel injection amount. These injections may be described as combusting post injections.

At 404, method 400 determines a post injection fuel quantity. The post injection fuel quantity is a fuel amount in defined in mg/stroke or similar units. A post injection fuel quantity is an amount of fuel injected to a single cylinder, and fuel delivered to the after treatment device may be injected to one or more cylinders. Fuel may be injected to each cylinder of a group of cylinders during a time period after combustion in the cylinder and before the exhaust valve of the cylinder closes.

In one example, the post injection fuel quantity is an amount of fuel injected to a cylinder after a combustion event in the cylinder and before intake valves of the cylinder open. The post fuel injection amount or quantity is determined via a table of empirically determined values that are indexed based on engine speed and load. Additionally, fuel injected after combustion may be injected in response to after treatment device temperature such that the fuel injection amount is adjusted to increase or decrease the after treatment device temperature. Method 400 proceeds to 406 after the desired post injection fuel quantity is determined.

At 406, method 400 determines mass in a cylinder receiving a post fuel injection quantity at the time fuel is injected to the cylinder. In one example, in-cylinder mass is determined as a function of mass air flow into the cylinder, cylinder EGR amount, engine speed, exhaust pressure, volumetric efficiency, and an amount of fuel injected to the cylinder before combustion in the cylinder during a cycle of the cylinder (e.g., fuel injected before post injection). In particular, air mass in the cylinder is determined from a mass air flow sensor, cylinder EGR mass is determined from air intake oxygen concentration, exhaust oxygen concentration, intake manifold pressure, intake manifold temperature, engine speed, and mass air flow into the engine. In one example, EGR mass is determined according to the following equation:

$$EGR = \frac{1 - \frac{O_{2,int}}{20.95}}{1 - \frac{O_{2,exh}}{20.95}}$$

where $O_{2,int}$ is intake oxygen concentration, $O_{2,exh}$ is exhaust oxygen concentration, and 20.95 is an approximation of oxygen percentage in air. In another example, EGR amount may be determined according to the following equation:

$$EGR = 1 - \frac{m_{air} \cdot R \cdot T_{man} \cdot 2 \cdot 1000}{P_{man} \cdot N \cdot 60 \cdot V_{disp} \cdot \eta_{vol}}$$

where $m_{air}$ is mass of air entering the engine, R is a gas constant, $T_{man}$ is intake manifold temperature, Pman is intake manifold pressure, N is engine speed, $V_{displ}$ is engine displacement, and $\eta_{vol}$ is volumetric efficiency.

The portion of mass in the cylinder attributable to injected fuel is based on the mass of fuel that is injected before the post injection fuel. The amount of fuel injected before the post injected fuel may be determined from a desired fuel injection quantity for combustion.

Mass in the cylinder is further adjusted in response to engine volumetric efficiency. In one example, engine volumetric efficiency is estimated based on empirical data stored in tables or functions in controller memory. The volumetric efficiency data may be indexed based on engine speed, engine load, and engine valve timing. Alternatively, volumetric efficiency may be adjusted based on sampled or inferred exhaust pressure. Cylinder density is adjusted based on the determined engine volumetric efficiency. For example, if engine volumetric efficiency is determined to be reduced, it may be determined that additional residual is in the cylinders, thereby increasing the cylinder temperature and/or lowering cylinder mixture density. Volumetric efficiency adjust the mass of residuals (e.g., internal EGR) in the cylinder and then fuel mass, air mass, and external EGR mass (are summed together to determine mass of the cylinder mixture. Method 400 proceeds to 408 after determining the in cylinder mass.

The above cylinder mass determination process applies if fuel injection occurs before EVO. However, if fuel injection occurs after EVO the above estimate of cylinder mixture mass may be reduced in response to time since EVO, engine speed, and crankshaft angle change since EVO. In one example, the change in cylinder mixture mass is adjusted based on an empirically determined multiplier that is stored in memory and indexed according engine speed, time since EVO, and crankshaft angle change since EVO. In an alternative example, in cylinder mixture density can be estimated via exhaust pressure and temperature according to the ideal gas law if fuel injection is after EVO. In particular, the cylinder pressure and exhaust pressure may be assumed as equal when determining cylinder mixture density.

At 408, method 400 estimates in cylinder temperature at the time fuel is injected for the post fuel injection during a cylinder cycle. In one example, temperature in a cylinder is determined according to the following equations:

$$PV^n = C$$

where P is cylinder pressure, V is cylinder volume at a specific crankshaft angle, n is a constant between 1.3 and 1.4, and C is a constant. Constant C can be equated to a cylinder pressure at a cylinder volume such that the following equation may be formed:

$$P_1 V_1^n = P_2 V_2^n$$

Solving for the ratio of pressures:

$$\frac{P_1}{P_2} = \left(\frac{V_2}{V_1}\right)^n$$

According to the ideal gas law:

$$P_1 V_1 = mRT_1 \Rightarrow \frac{P_1 V_1}{T_1} = mR$$

$$P_2 V_2 = mRT_2 \Rightarrow \frac{P_2 V_2}{T_2} = mR$$

where m is a number of moles of a gas, R is the gas constant, and $T_1$ and $T_2$ are temperatures of the gas at $P_1 V_1$ and $P_2 V_2$. In particular $T_1$ is temperature at exhaust valve opening, $V_1$ is cylinder volume at exhaust valve opening, $V_2$ is a cylinder volume at a time in the exhaust stroke, and $T_2$ is a cylinder temperature during the exhaust stroke. Substituting yields:

$$\frac{P_1 V_1}{T_1} = \frac{P_2 V_2}{T_2} \Rightarrow \frac{P_1}{P_2} = \frac{V_2 T_1}{V_1 T_2}$$

and $$\left(\frac{V_2}{V_1}\right)^n = \frac{V_2 T_1}{V_1 T_2} \Rightarrow \left(\frac{V_2}{V_1}\right)^{n-1} = \frac{T_1}{T_2}$$

which given $T_1$ can be solved for $T_2$. $T_1$ can be estimated via lookup tables that are indexed based on engine speed and load. Method 400 proceeds to 410 after cylinder temperature is estimated.

In the cylinder temperature estimate of 408, temperature $T_1$ is at or before EVO, and $T_1$ decreases as a function of time since EVO, crankshaft angle after EVO, and ECT when fuel injection is after EVO. The amount that $T_1$ is decreased after EVO may be empirically determined and stored in memory for later use. The $T_1$ temperature adjustment may be indexed via time since EVO, crankshaft angle since EVO, and ECT.

At 410, method 400 determines start of fuel injection timing for the post injection fuel quantity. In one example, the start of fuel injection timing is empirically determined and stored in table or functions in controller memory. The tables or functions may be indexed via engine speed, engine load, injection timing during the intake and compression strokes, engine temperature, and intake air temperature. For example, start of injection timing for injecting post combustion fuel may be based on an amount of time or crankshaft degrees since end of combustion. End of combustion time may be estimated based on empirically determined cylinder temperatures and pressures. When multiple post injections to a cylinder are provided during a single cycle of the cylinder, start of injection timing for each post fuel injection after the first post fuel injection occur at a start of injection time that is the end of injection time for the last injection event of the cylinder plus an amount of time that it take to reopen the fuel injector. The start of fuel injection timing for each post fuel injection is determined and method 400 proceeds to 412. Note again that post fuel injections occur after combustion in the cylinder and before exhaust valve closing.

At 412, method 400 determines the quantity of post injection fuel that may be injected in a single injection without liquid fuel in fuel spray impinging on the cylinder wall. As noted above, the desired post injection fuel quantity determined at 404 may be injected to one or more engine cylinders via a plurality fuel injections. For example, each cylinder of a cylinder bank may provide two post injections for four cylinder cycles until the total desired post injection fuel quantity is injected to regenerate a DPF.

In one example, the quantity limit for one fuel injection provided to a cylinder is determined via looking up calculated or empirically determined fuel injection amounts that are stored in functions or tables that are indexed via cylinder mixture temperature, cylinder density, and bio-fuel content in the fuel being injected. In one example, the post injection fuel quantity is expressed as:

$$Q_{post,max} = f(\rho(CA), T(CA))$$

where $Q_{post,\,max}$ is a maximum post injection fuel amount for a single injection event after combustion and before exhaust valve closing, $\rho$ is cylinder mixture density as a function of crankshaft angle, T is cylinder gas mixture temperature as a function of crankshaft angle. The cylinder density is based on mass in the cylinder and cylinder volume. In some examples, the post injection fuel amount final crankshaft angle may be estimated and iteratively adjusted so that the post injection quantity can be determined based on the cylinder density and temperature at the end of injection timing. Thus, in one example, the post fuel injection amount is based on end of post fuel injection timing.

At 414, method 400 injects as many maximum post injection amounts as determined at 410 as is possible during a cylinder cycle limited by the post injection fuel quantity at 404. If the post injection fuel quantity cannot be injected during as many fuel injections as may be provided in a cylinder cycle, the remaining fuel is split between all post injections during the present cylinder cycle. Thus, for a given cylinder during a given cycle, there is a target or desired post fuel injection quantity specified in mg. The target or desired post fuel injection quantity is split into multiple pulses after combustion in the cylinder and before EVC. Any remainder fuel is determined via equations that subtract the maximum post fuel injection quantity for a given pulse from the target or desired total post fuel injection quantity for one cylinder and one cycle. This operation is performed iteratively until there is no more fuel or no more pulses available. Since the desired post fuel injection quantity must be reached, the remaining fuel is split between the pulses. For example, any remaining fuel that does not fit in the amount of time between end of combustion in the cylinder and EVC is added to the injection quantity of each fuel injection after combustion in the cylinder and before EVC. Such an operation may minimize the possibility of wall wetting. For example, in one example, the desired post injection fuel quantity can be updated via the following equations:

$$Q_{post} - Q_{inj} = Q_{rem}$$

$$Q_{post} = Q_{rem}$$

where $Q_{post}$ is the desired amount of post injection fuel as determined at 404, where $Q_{inj}$ is the amount of fuel injected during a most recent individual post fuel injection, and where $Q_{rem}$ is a remainder resulting from subtracting the most recent fuel injection amount from the desired amount of post injection fuel. Method 400 proceeds to exit after the post fuel injections for a cylinder cycle are scheduled and/or injected.

Thus, the method of FIG. 4 provides for a method for regenerating an exhaust after treatment device, comprising: performing combustion in a cylinder of an engine during a cylinder cycle; injecting an amount of fuel in a fuel injection pulse after a combustion event in the cylinder and before exhaust valve closing during the cylinder cycle, the amount of fuel in the fuel injection pulse adjusted for a density of a gas mixture in the cylinder; and regenerating an after treatment device via the amount of fuel. The method includes where the density is adjusted for an amount of exhaust gas in the cylinder before performing combustion in the cylinder of the engine during the cylinder cycle. The method also includes where the density is adjusted for an amount of fuel injected to the cylinder that participates in combustion during the cylinder cycle.

In some examples, the method further comprises providing additional fuel injections to the cylinder during the cylinder cycle after the combustion event and before exhaust valve closing during the cylinder cycle and adjusting the amount of fuel in the fuel injection pulse in response to a temperature of the gas mixture in the cylinder. The method includes where the fuel injection pulse is one of a plurality of fuel pulses that sum to a desired post injection fuel quantity to regenerate an after treatment device, and further comprising adjusting the amount of fuel in the fuel injection pulse in response to a cylinder air amount inducted into the cylinder. The method further comprises adjusting the amount of fuel in the fuel injection pulse in response to a volumetric efficiency of the engine. The method includes where the amount of fuel injected is less than an amount of injected fuel that leads to liquid fuel impingement on cylinder wall. The method further comprises where the amount of fuel in the fuel injection pulse is adjusted in response to an estimated temperature in the cylinder at a time when the amount of fuel in the fuel injection is injected.

The method of FIG. 4 also provides for regenerating an exhaust after treatment device, comprising: performing combustion in a cylinder of an engine during a cylinder cycle; injecting an amount of fuel in a fuel injection pulse after combustion in the cylinder and before exhaust valve closing during the cylinder cycle, the amount of fuel in the fuel injection pulse adjusted for a cylinder volumetric efficiency; and regenerating an after treatment device via the amount of fuel. In this way, the amount of post injected fuel accounts for a change in engine volumetric efficiency that can change liquid fuel penetration in the cylinder.

In one example, the method further comprises additional fuel injections to the cylinder during the cylinder cycle after combustion and before exhaust valve closing during the cylinder cycle and adjusting the amount of fuel injected in the fuel injection pulse in response to a temperature of a gas mixture in the cylinder. The method includes where the fuel injection pulse is one of a plurality of fuel pulses that sum to a desired post injection fuel quantity to regenerate an after treatment device. The method further comprises adjusting a subsequent fuel injection pulse that is injected to the cylinder after combustion and before exhaust valve closing in the cylinder during a subsequent cylinder cycle, the subsequent fuel injection pulse based on an amount of fuel remaining to be injected that when added to an amount of fuel already injected equals the desired post injection quantity. The method includes were the volumetric efficiency of the cylinder is estimated based on engine speed and load. The method includes where the volumetric efficiency is further based on cam timing. The method further comprises reducing a desired post injection fuel amount based on the amount of fuel in the fuel injection pulse and iteratively further reducing the desired post injection fuel amount based on fuel injected to the cylinder after injecting the amount of fuel in the fuel injection pulse.

As will be appreciated by one of ordinary skill in the art, the method described in FIG. 4 may represent one or more of any number of processing strategies such as event-driven, interrupt-driven, multi-tasking, multi-threading, and the like. As such, various steps or functions illustrated may be performed in the sequence illustrated, in parallel, or in some cases omitted. Likewise, the order of processing is not necessarily required to achieve the objects, features, and advantages described herein, but is provided for ease of illustration and description. Although not explicitly illustrated, one of ordinary skill in the art will recognize that one or more of the illustrated steps, methods, or functions may be repeatedly performed depending on the particular strategy being used.

This concludes the description. The reading of it by those skilled in the art would bring to mind many alterations and modifications without departing from the spirit and the scope of the description. For example, single cylinder, I2, I3, I4, I5, V6, V8, V10, V12 and V16 engines operating in natural gas, gasoline, diesel, or alternative fuel configurations could use the present description to advantage.

The invention claimed is:

1. A method for regenerating an exhaust after treatment device, comprising:
performing combustion in a cylinder of an engine during a cylinder cycle;
injecting an amount of fuel in a fuel injection pulse after a combustion event in the cylinder and before exhaust valve closing during the cylinder cycle via a controller, the amount of fuel in the fuel injection pulse adjusted for a density of a gas mixture in the cylinder, a penetration in the cylinder of the fuel injection pulse adjusted for a cylinder volumetric efficiency; and
regenerating an after treatment device via the amount of fuel.

2. The method of claim 1, where the density is adjusted for an amount of exhaust gas in the cylinder before performing combustion in the cylinder of the engine during the cylinder cycle.

3. The method of claim 1, where the density is adjusted for an amount of fuel injected to the cylinder that participates in combustion during the cylinder cycle.

4. The method of claim 1, further comprising providing additional fuel injections to the cylinder during the cylinder cycle after the combustion event and before exhaust valve closing during the cylinder cycle and adjusting the amount of fuel in the fuel injection pulse in response to a temperature of the gas mixture in the cylinder.

5. The method of claim 1, where the fuel injection pulse is one of a plurality of fuel pulses that sum to a desired post injection fuel quantity to regenerate an after treatment device, and further comprising adjusting the amount of fuel in the fuel injection pulse in response to a cylinder air amount inducted into the cylinder.

6. The method of claim 1, further comprising adjusting the amount of fuel in the fuel injection pulse in response to a volumetric efficiency of the engine.

7. The method of claim 1, where the amount of fuel injected is less than an amount of injected fuel that leads to liquid fuel impingement on a cylinder wall.

8. The method of claim 7, further comprising where the amount of fuel in the fuel injection pulse is adjusted in response to an estimated temperature in the cylinder at a time when the amount of fuel in the fuel injection is injected.

9. A method for regenerating an exhaust after treatment device, comprising:
performing combustion in a cylinder of an engine during a cylinder cycle;
injecting an amount of fuel in a fuel injection pulse after combustion in the cylinder and before exhaust valve closing during the cylinder cycle via a controller, a penetration in the cylinder of the fuel injection pulse adjusted for a cylinder volumetric efficiency; and
regenerating an after treatment device via the amount of fuel.

10. The method of claim 9, further comprising additional fuel injections to the cylinder during the cylinder cycle after combustion and before exhaust valve closing during the cylinder cycle and adjusting the amount of fuel injected in the fuel injection pulse in response to a temperature of a gas mixture in the cylinder.

11. The method of claim 9, where the fuel injection pulse is one of a plurality of fuel pulses that sum to a desired post injection fuel quantity to regenerate an after treatment device.

12. The method of claim 11, further comprising adjusting a subsequent fuel injection pulse that is injected to the cylinder after combustion and before exhaust valve closing in the cylinder during a subsequent cylinder cycle, the subsequent fuel injection pulse based on an amount of fuel remaining to be injected that, when added to an amount of fuel already injected, equals the desired post injection quantity.

13. The method of claim 9, where the volumetric efficiency of the cylinder is estimated based on engine speed and load.

14. The method of claim 13, where the volumetric efficiency is further based on cam timing.

15. The method of claim 9, further comprising reducing a desired post injection fuel amount based on the amount of fuel in the fuel injection pulse and iteratively further reducing the desired post injection fuel amount based on fuel injected to the cylinder after injecting the amount of fuel in the fuel injection pulse.

16. An engine system, comprising:
an engine including a cylinder and an exhaust system;
an after treatment device in an exhaust system;
a fuel injector supplying fuel to the cylinder; and
a controller including instructions stored in non-transitory memory to regenerate an after treatment device, the controller including additional instructions to adjust fuel penetration in the cylinder of an amount of fuel supplied to the cylinder via the fuel injector in response to cylinder volumetric efficiency and a temperature of gases in the cylinder after a combustion event in the cylinder during a present cylinder cycle, the amount of fuel injected after the combustion event and before an exhaust valve closing of the cylinder during a cycle of the cylinder.

17. The engine system of claim 16, where the amount of fuel injected is less than an amount of injected fuel that leads to liquid fuel impingement on a cylinder wall.

18. The engine system of claim 16, further comprising additional controller instructions for providing a plurality of fuel injections after the combustion event and before the exhaust valve closing.

19. The engine system of claim 16, further comprising additional controller instructions to inject fuel to a second cylinder after a combustion event in the second cylinder during a present cylinder cycle of the second cylinder and in response to volumetric efficiency of the second cylinder.

20. The engine system of claim 16, further comprising evenly distributing a remainder of a post injection fuel quantity for a cylinder cycle between a maximum number of fuel injections that occur after combustion in the cylinder and before exhaust valve closing in the cylinder.

* * * * *